US005773135A

United States Patent [19]

Lafond

[11] Patent Number: 5,773,135

[45] Date of Patent: Jun. 30, 1998

[54] INSULATED ASSEMBLY INCORPORATING A THERMOPLASTIC BARRIER MEMBER

[76] Inventor: Luc Lafond, 23 Woodvalley Drive, Etobicoke, Ontario, Canada, M9A 4H4

[21] Appl. No.: 513,180

[22] Filed: Aug. 9, 1995

Related U.S. Application Data

[63] Continuation-in-part of Ser. No. 477,950, Jun. 7, 1995, Pat. No. 5,616,415, which is a continuation-in-part of Ser. No. 871,016, Apr. 20, 1992, Pat. No. 5,441,779.

[30] Foreign Application Priority Data

Apr. 22, 1991 [CA] Canada .................................. 2040636

[51] Int. Cl.[6] ........................................................ B32B 3/26

[52] U.S. Cl. .................. 428/304.4; 428/192; 428/309.9; 428/319.3

[58] Field of Search ............................ 428/34, 192, 212, 428/304.4, 309.9, 319.3; 52/172, 786.13; 49/475.1

[56] References Cited

U.S. PATENT DOCUMENTS

| | | | |
|---|---|---|---|
| 3,823,524 | 7/1974 | Weinstein | 52/729 |
| 4,113,905 | 9/1978 | Kessler | 428/34 |
| 4,822,649 | 4/1989 | Canaud et al. | 428/34 |
| 4,831,799 | 5/1989 | Glover et al. | 52/172 |
| 4,950,344 | 8/1990 | Glover et al. | 156/109 |
| 5,007,217 | 4/1991 | Glover et al. | 52/172 |
| 5,048,997 | 9/1991 | Peterson | 403/295 |
| 5,106,663 | 4/1992 | Box | 428/34 |
| 5,120,584 | 6/1992 | Ohlenyorst | 428/34 |

*Primary Examiner*—Donald Loney
*Attorney, Agent, or Firm*—Ian Fincham

[57] ABSTRACT

An insulating spacer for use in glazing assemblies is provided. The spacer comprises a foamed insulating body and further includes a second sealant material. The insulating body partially contacts the substrates as does the sealant to provide a double seal when used in a glazing assembly. In other embodiments the spacer is a composite of foam, sealant material, rigid plastics and desiccated matrices. A further embodiment discloses an undulating foam spacer body for easy manipulation about the corner in glazing assemblies. The result of incorporation of the foam is a substantially energy efficient spacer and assembly.

5 Claims, 1 Drawing Sheet

INSULATED ASSEMBLY INCORPORATING A THERMOPLASTIC BARRIER MEMBER

This is application is a continuation-in-part application of U.S. application Ser. No. 08/477,950, filed Jun. 7, 1995 now U.S. Pat. No. 5,616,415, which, in turn, is a continuation-in-part application of U.S. application Ser. No. 07/871,016 filed Apr. 20, 1992 now U.S. Pat. No. 5,441,779.

FIELD OF THE INVENTION

This invention relates to a composite spacer for use in an insulated glass assembly and further relates to an insulated glass assembly incorporating such a spacer.

BACKGROUND OF THE INVENTION

Insulated assemblies presently known in the art incorporate the use of various polymeric substances in combination with other materials. One such assembly includes a butylated polymer in which there is embedded an undulating metal spacer. Although useful, this type of sealant strip is limited in that the metal spacer, over time, becomes exposed to the substrates which results in a drastic depreciation in the efficiency of the strip. The particular difficulty arises with moisture vapour transmission when the spacer becomes exposed and contacts the substrates.

Further, many of the butylated polymers currently used in insulated glass assemblies are impregnated with a desiccant. This results in a further problem, namely decreased adhesiveness of the butylated sealant.

Glover, et al. in U.S. Pat. No. 4,950,344, provide a spacer assembly including a foam body separated by a vapour barrier and further including a sealant means about the periphery of the assembly. Although this arrangement is particularly efficient from an energy point of view, one of the key limitations is that the assembly must be fabricated in a number of steps. Generally speaking, the sealant must be gunned about the periphery in a subsequent step to the initial placement of the spacer. This has ramifications during the manufacturing phase and is directly related to increased production costs and, therefore, increased costs in the assembly itself.

It has been found particularly advantageous to incorporate, as a major component of the spacer, a soft, resilient insulated body, having a low thermal conductivity. Examples of materials found to be useful include natural and synthetic elastomers (rubber), cork, EPDM, silicones, polyurethanes and foamed polysilicones, urethanes and other suitable foamed materials. Significant benefits arise from the choice of these materials since not only are they excellent insulators from an energy point of view but additionally, depending on the materials used, the entire spacer can maintain a certain degree of resiliency. This is important where windows, for example, engaged with such a strip experience fluctuating pressure forces as well as a thermal contraction and expansion. By making use of a resilient body, these stresses are alleviated and accordingly, the stress is not transferred to the substrates as would be the case, for example, in assemblies incorporating rigid spacers.

The foam body may be manufactured from thermoplastic or thermosetting plastics. Suitable examples of the thermosets include silicone and polyurethane. In terms of the thermoplastics, examples include silicone foam or elastomers, one example of the latter being, SANTOPRENE™. Advantages ascribable to the aforementioned compounds include, in addition to what has been included above, high durability, minimal outgassing, low compression, high resiliency and temperature stability, inter alia.

Of particular use are the silicone and the polyurethane foams. These types of materials offer high strength and provide significant structural integrity to the assembly. The foam material is particularly convenient for use in insulating glazing or glass assemblies since a high volume of air can be incorporated into the material without sacrificing any structural integrity of the body. This is convenient since air is known to be a good insulator and when the use of foam is combined with a material having a low thermal conductivity together with the additional features of the spacer to be set forth hereinafter, a highly efficient composite spacer results. In addition, foam is not susceptible to contraction or expansion in situations where temperature fluctuations occur. This clearly is beneficial for maintaining a long-term uncompromised seal in an insulated substrate assembly.

It would be desirable to have a composite spacer which overcomes the limitations of desiccated butyl as well as requiring the addition of sealant material in a subsequent procedure. The present invention is directed to satisfying the limitations in the known art.

SUMMARY OF THE INVENTION

One object of the present invention is to provide an improved spacer for use in insulated glass or glazing assemblies.

Another object of the present invention, is to provide a composite spacer for spacing substrates in a glazing assembly comprising an insulating body having spaced apart sides, a front face and a rear face, each side including a recess therein, each side having a first substrate engaging surface; and sealant material in each recess forming a second substrate engaging surface coplanar with the first substrate engaging surface.

As an attendant advantage, it has been found that the desiccated matrix, the insulating body and the sealant material may be simultaneously extruded in a one-piece integral spacer depending upon the type of material chosen for the insulating body. This is useful in that it prevents subsequent downstream processing related to filling or gunning sealant material in a glazing unit and other such steps. In this manner, the spacer, once extruded can be immediately employed in a glazing unit.

In accordance with one embodiment of the present invention, it has been found that by making use of a generally T-shaped insulating body which is received within a generally C-shaped configuration including sealant and a desiccated matrix, the result is that the assembly can have at least two sealing surfaces derived from the sealant material and the projecting portions on the foam body as a result of the T-shape. This is not only advantageous from a sealing point of view, but additionally precludes formation of a thermal bridge effect in view of the fact that there are at least two different materials employed in the spacer.

As will be appreciated by those skilled in the art, in the assembly, polyisobutylene (PIB), butyl or other suitable sealant or butylated material may extend about the periphery of the assembly and therefore, provides a further sealed surface. Sealing or other adhesion for the insulating body projections may be achieved by providing special adhesives, e.g. acrylic adhesive in this area. Further, the insulating body at the projections may be uncured so that on application of heat, the body adheres directly to the substrate. This is effective where the body is composed of, for example, an ultra-violet curable material.

A further object of the present invention is to provide a composite spacer for use in insulated glazing assembly, comprising a body of insulating material having opposed sides and opposed faces, each side having a portion of material removed therefrom to provide a recess and projection, each projection for sealing a respective substrate; sealant material in each recess coplanar with each projection for sealing a respective substrate; and a desiccant matrix separate from and associated with the spacer. The desiccant material may be in the form of a matrix of a semi-permeable material, e.g. various silicones with the desiccant material dispersed therein. As is well known in the art, any suitable desiccant material may be incorporated in the matrix. Where a matrix is not elected for use in the spacer, a sealant material may include a desiccant material. This will depend on the intended application of the spacer.

In situations where it is desirable not to sever or otherwise interrupt the spacer in an insulated assembly, it is desirable to have an insulating spacer body which subscribes to an undulating or sinusoidal profile. This facilitates easy bending about corners and thus clearly circumvents the energy consequences associated with severing the spacer.

According to a further object of the present invention, there is provided a composite spacer for spacing substrates in a glazing assembly, comprising an undulating body of insulating material; and sealant material adhesively engaged with the undulating body.

A further object of one embodiment of the present invention is to provide a one-piece composite spacer for spacing substrates, the spacer having opposed substrate engaging surfaces, comprising:

- a foam body, the foam body having a pair of first discrete sealing surfaces, each surface adapted for sealing engagement with a substrate;
- a pair of second discrete sealing surfaces of a second material different from the foam, the surfaces being integral with the foam body; and
- a pair of third discrete sealing surfaces of a third material different from the foam material, the surfaces being integral with the foam body, wherein the spacer provides substrate engaging surfaces each having a plurality of discrete sealing surfaces.

Having thus generally described the invention, reference will now be made to the accompanying drawings illustrating preferred embodiments.

BRIEF DESCRIPTION OF THE DRAWINGS

Similar numerals in the drawings denote similar elements.

DETAILED DESCRIPTION OF THE PREFERRED EMBODIMENTS

Figure 1:
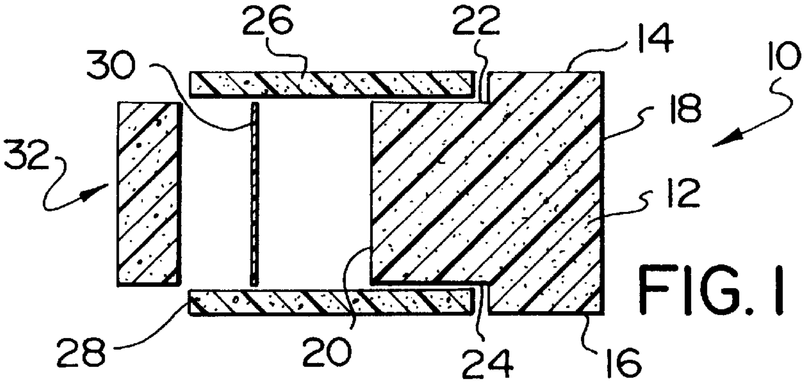
FIG. 1 is an end exploded view of one embodiment of the present invention.

Referring now to FIG. 1, shown is a composite spacer according to one embodiment of the present invention, the composite spacer being globally denoted by numeral 10. As is illustrated, the spacer 10 includes an insulating body 12 subscribing to a generally "T-shaped" configuration. The body 12 includes spaced-apart sides 14 and 16 and opposed faces 18 and 20. Each of sides 14 and 16 include a recess 22 and 24, respectively. The depth of the recess will vary from application to application, but typically the depth will comprise from approximately 2% to, for example, 25% of the depth of the body 12. As is illustrated FIG. 1, the overall size of the body is a significant portion of the entire size of the composite spacer. Sides 14 and 16 act as substrate engaging surfaces each for sealing engagement with a substrate (not shown). To this end, each of the sides 14 and 16 may include an adhesive (not shown) to assist in the sealing and adhering engagement of a substrate with a respective side. Secondly, as a further possibility, the sides may comprise uncured material where the body 12 is formed of a material capable of bonding with, for example, glass substrates. In order to further assist in supporting a substrate engaged with sides 14 and 16, the recesses 22 and 24 accommodate sealant material 26 and 28 which contact each of the recesses and when in contact, maintain a coplanar relationship with each side 14 and 16, respectively. By maintaining the coplanar relationship, there is provided an even surface upon which a substrate may be engaged. Further, the combination of 14, 26 and 16, 28 provides discrete sealing surfaces for engaging a substrate, the surfaces being integral with the spacer 10.

As an optional feature, the composite spacer 10 as illustrated in FIG. 1 may include a fluid barrier 30 for contact with face 20 of body 12. In one possible embodiment, the fluid barrier may comprise a PET film which may further include an aluminum or other suitable metal. In addition, other either metallized or non-metallized films are contemplated for use in this capacity.

As a further feature, the composite spacer 10 may include a desiccant matrix, globally denoted by numeral 32. Suitable desiccant matrices are well known in the art and can include zeolite beads, silica gel, calcium chloride, etc., all of which may be matrixed within a semi-permeable flexible material such as a polysilicone or other suitable semi-permeable substance. This may be positioned between the strips of sealant 26 and 28. As a further option, the desiccant material may be incorporated into a continuing body of butyl material as opposed to a separate matrix associated with the composite spacer.

Figure 2:
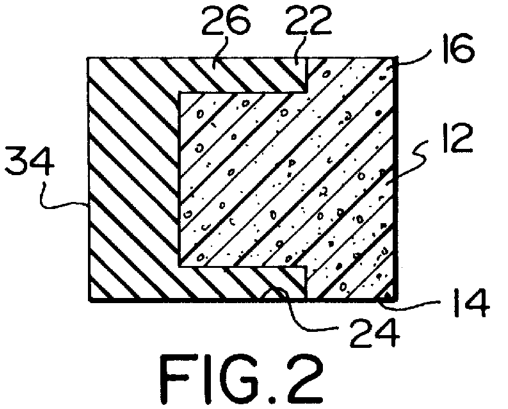
FIG. 2 is an end view of a second embodiment of the present invention.

Reference will now be made to FIG. 2 where in the above generally mentioned embodiment has been discussed. In the embodiment shown in FIG. 2, the body 10 is simply engaged with a body of sealant material, globally denoted by numeral 34. In the embodiment shown in FIG. 2, the body of sealant material generally subscribes to a "C-shaped" configuration with full engagement of the sealant with the recesses 22 and 24 of the body 12.

Of particular convenience, it has been found that the insulating body, the sealant and the desiccated matrix can be simultaneously extruded into a one piece integral unit. This is possible when the insulating body is composed of a material capable of being extruded. Clearly, this is advantageous since it avoids the step of gunning in sealant material etc., which was previously required in earlier arrangements.

Figure 3:
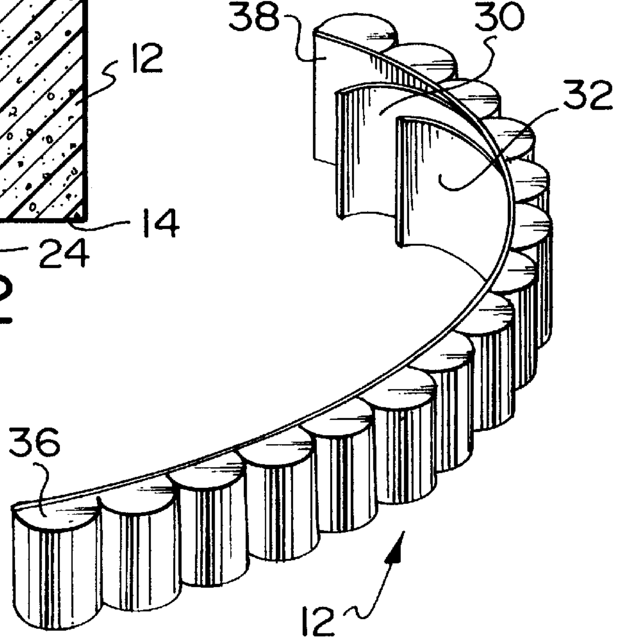
FIG. 3 is a perspective view of a composite spacer according to a further embodiment of the present invention.

Referring now to FIG. 3, shown is a further embodiment of the present invention wherein the insulating body 12 is in the form of an undulating arrangement. More specifically, body 12 in FIG. 3 provides a first face 36 having an undulating or sinusoidal profile and a smooth non-undulating or planar opposed face 38. In the embodiment shown, the smooth planar face 38 may additionally include a vapour barrier 30 and desiccated matrix 32 as set forth with respect to FIG. 1. The spacer 10 would be positioned within an insulating assembly (not shown) such that the smooth planar face 38 would be within the atmosphere of the assembly (not shown).

It has been found that by providing an undulating face 36 in the body that the same may be bent readily about corners during the formation of insulated glass assemblies. This is particularly attractive in view of the fact that there is no severance of the strip which would otherwise be encountered in arrangements not specifically including the undulating face. By retaining the spacer in a continuous form, less energy loss occur at the corners of an insulated assembly. A concomitant advantage of the sinusoidal/undulating profile is that, the body, when bent does not "buckle" or "bulge" at the substrate engaging surfaces or elsewhere but rather stays substantially uniform in dimension thus further ensuring even substrate engaging surfaces and therefore an effective seal.

Figure 4:
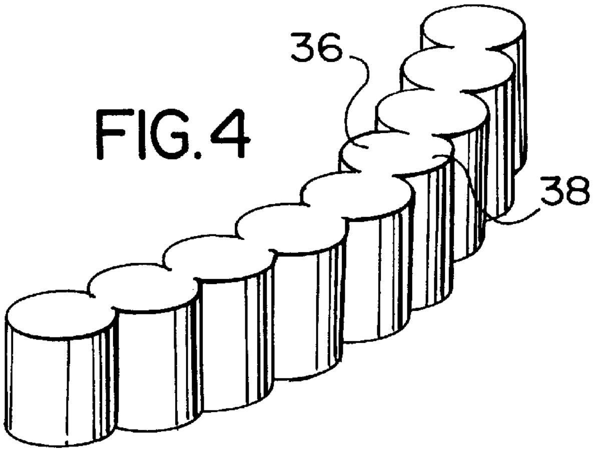
FIG. 4 is a perspective view of an alternate embodiment of the spacer illustrated at FIG. 3; and, FIG. 5 is a perspective view of a glazing assembly illustrating the disposition of a spacer therein.

Turning to FIG. 4, shown is an alternate embodiment of FIG. 3 where face 38 additionally is of an undulating form. Depending on the application, either the embodiments set forth with respect to FIG. 3 or 4 may be employed.

Figure 5:
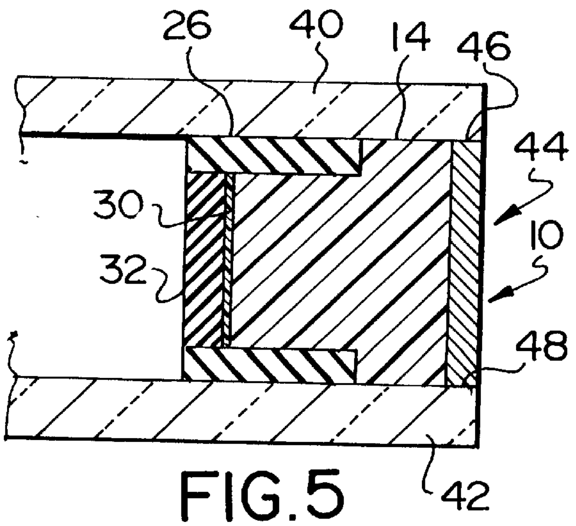

Referring now to FIG. 5, shown is a side elevational view of an insulated glass assembly or glazing assembly where the spacer of FIG. 1 is positioned between two opposed substrates 40 and 42. Sealant material 44, having opposed sides 46 and 48 seals the perimeter of the assembly and contacts face 18 of body 12. Sealant 44 may be co-extruded with the spacer 10 to provide a "sandwiched" foam body 12 as illustrated. In this embodiment, the spacer provides a multitude of discrete sealing surfaces, namely those created from elements 26, 28 and 14, 16 as well as from 46, 48.

In this system, in the event of a breach or compromise of one of the seals, any one of the auxiliary seals prevents the assembly from becoming energetically ineffectual.

It will be appreciated by those skilled in the art, although only a double pane glazing assembly is illustrated, the spacer assembly as set forth in the disclosure, can readily be employed in multiple pane assemblies.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modification form part of the present invention insofar as they do not depart from the spirit, nature and scope of the claimed and described invention.

I claim:

1. A composite spacer for spacing substrates, said spacer having opposed substrate engaging surfaces, comprising:

a foam body, said foam body having a pair of first surfaces, each said first surface adapted for sealing engagement with a substrate;

a pair of second substrate engaging surfaces of a layer of a second material different from said foam, said second surfaces being coplanar with said first surfaces of said foam body; and a pair of third substrate-engaging surfaces of a layer of a third material different from said foam material, said third surfaces being coplanar with said first and second surfaces and, whereby said spacer provides a pair of opposed substrate engaging surfaces each having a plurality of discrete component surfaces adapted to seal with said substrates and with said first surfaces in a position to be non-adjacent the space enclosed by the substrates on assembly, and with one of said layers extending in the plane of the assembled substrates.

2. A composite spacer as set forth in claim 1, including at least one additional layer selected from a fluid barrier and a desiccant-containing matrix.

3. A composite spacer as set forth in claim 1, wherein said foam body comprises an ultra-violet curable foam.

4. A composite spacer as set forth in claim 1, wherein said second material and said third material are selected from a group comprising polyurethane, butyl, polyisobutylene or mixtures thereof.

5. A composite spacer for spacing substrates according to claim 1, in the form of a body extrudable as a single unit.

* * * * *